United States Patent
Trattler

(10) Patent No.: US 7,738,265 B2
(45) Date of Patent: Jun. 15, 2010

(54) CONTROL SYSTEM FOR A VOLTAGE CONVERTER AND METHOD

(75) Inventor: Peter Trattler, Graz (AT)

(73) Assignee: Austriamicrosystems AG, Unterpremstatten (AT)

(*) Notice: Subject to any disclaimer, the term of this patent is extended or adjusted under 35 U.S.C. 154(b) by 245 days.

(21) Appl. No.: 12/064,485

(22) PCT Filed: Aug. 28, 2006

(86) PCT No.: PCT/EP2006/008410

§ 371 (c)(1),
(2), (4) Date: Apr. 3, 2008

(87) PCT Pub. No.: WO2007/025702

PCT Pub. Date: Mar. 8, 2007

(65) Prior Publication Data

US 2008/0239766 A1 Oct. 2, 2008

(30) Foreign Application Priority Data

Aug. 29, 2005 (DE) .................. 10 2005 040 876

(51) Int. Cl.
*H02M 3/335* (2006.01)
*H02M 3/24* (2006.01)
(52) U.S. Cl. .................... 363/20; 363/97
(58) Field of Classification Search .......... 363/16, 363/20, 21.04, 21.05, 21.12, 21.13, 95, 97, 363/131
See application file for complete search history.

(56) References Cited

U.S. PATENT DOCUMENTS

| 5,138,543 A | 8/1992 | Harm et al. |
| 5,614,812 A * | 3/1997 | Wagoner ............ 323/222 |
| 6,219,262 B1 * | 4/2001 | Burgyan ............ 363/97 |
| 6,344,983 B1 * | 2/2002 | Glennon ............ 363/21.12 |
| 6,518,733 B1 | 2/2003 | Schenkel et al. |
| 7,375,471 B2 * | 5/2008 | Matsumura ........... 315/241 P |
| 7,480,159 B2 * | 1/2009 | Wei et al. ........... 363/21.18 |
| 7,609,533 B2 * | 10/2009 | Chuang et al. ........ 363/19 |

(Continued)

FOREIGN PATENT DOCUMENTS

DE    3615168    11/1987

(Continued)

OTHER PUBLICATIONS

O'Loughlin, Michael, "Circuit provides leading-edge blanking", EDN Electrical Design News, Reed Business Information, Highlands Ranch, CO, US, vol. 48, No. 12, May 29, 2003, pp. 74 and 76.

(Continued)

*Primary Examiner*—Matthew V Nguyen
(74) *Attorney, Agent, or Firm*—Fish & Richardson P.C.

(57) ABSTRACT

A control arrangement for a voltage converter includes a first input electrically connected to a device configured to sense a first current in a primary side of a transformer and a first output electrically connected to a control terminal of a transistor. The transistor is electrically connected with the primary side of the transformer and the first output is configured to supply a control signal to the control terminal. The control arrangement also includes a computing unit configured to adjust the control signal so that the transistor has a low resistance value during a switched-on phase and a high resistance value during a switched-off phase.

20 Claims, 5 Drawing Sheets

U.S. PATENT DOCUMENTS

2003/0141853 A1    7/2003    Mulhauser

FOREIGN PATENT DOCUMENTS

| DE | 4105464 | 10/1991 |
| JP | 09084340 | 3/1997 |
| WO | WO 97/13314 | 4/1997 |
| WO | WO 03/065540 | 8/2003 |
| WO | WO 2004/042905 | 5/2004 |
| WO | WO 2005/018076 | 2/2005 |

OTHER PUBLICATIONS

International Search Report from corresponding PCT Application No. PCT/EP2006/008410, mailed Jun. 21, 2007, in English and German language, 3 pages each.

English translation of the International Preliminary Examination Report for PCt/EP2006/00841, Jul. 28, 2008.

* cited by examiner

CONTROL SYSTEM FOR A VOLTAGE CONVERTER AND METHOD

CROSS REFERENCE TO RELATED APPLICATIONS

Pursuant to 35 USC §120, this application claims the benefit of PCT/EP2006/008410 filed Aug. 28, 2006 which claims the benefit of German Patent Application No. 102005040876.1 filed Aug. 29, 2005. Each of these applications is incorporated by reference in its entirety.

FIELD OF THE INVENTION

A circuit arrangement for a voltage converter for converting a first DC voltage into a second DC voltage, a voltage converter, and a method for converting a first DC voltage into a second DC voltage is described herein.

Voltage converters used to convert a first DC voltage into a second DC voltage usually require a control arrangement for their operation, in order to supply a control signal to an active component in the voltage converter. Voltage converters can be used both to convert a DC voltage downwards and to generate a higher DC voltage. They are also referred to as direct current/direct current converters, or DC/DC converters for short. Transformers are usually used for this purpose. A primary side of the transformer is coupled to a voltage source, while the voltage generated can be accessed at a secondary side of the transformer.

BACKGROUND

The document U.S. Pat. No. 6,518,733 B1 shows a circuit and methods for circuits for charging capacitors. The circuit incorporates a transformer having a primary and a secondary side. A current flows from the voltage source through the primary side of the transformer and through a bipolar transistor as well as through a first resistor to ground. A terminal of the secondary side is connected through a second resistor to ground. The voltages across the first and second resistors are taken for control purposes. The circuit therefore uses signals from the primary and secondary sides of the transformer in order to control the voltage converter.

A control arrangement with which a voltage converter for changing a first DC voltage into a second DC voltage can be controlled without great difficulty, as well as a voltage converter and a method whereby, again with little difficulty, the first DC voltage can be converted into a second DC voltage is described herein.

SUMMARY

In some aspects, the task of providing an arrangement is fulfilled by a control arrangement for converting a first DC voltage into a second DC voltage comprising a first input, a first output, a computing unit and a first comparator.

The first input of the control arrangement is designed with a connection to a means of sensing a first current. The first current can be accessed at a primary side of a transformer which can be connected according to the proposed principle to the control arrangement; it can be connected in order to convert a first DC voltage into a second DC voltage.

The first output of the control arrangement is designed to be connected to a control terminal of a transistor that can be connected to the control arrangement. A controlled channel within the transistor can be connected in series with the primary side of the transformer. The first output is provided to supply a control signal to the control terminal of the transistor.

The computing unit is connected to the first output of the control arrangement. It is designed to drive the control signal of the transistor in such a way that a controlled channel of the transistor, during the time when it is switched on, has a lower value of resistance than the resistance value it has during the time when it is switched off.

A first input of the first comparator is connected to the first input of the control arrangement. The first input of the control arrangement serves to supply a value of the first current, or a value derived from the value of the first current, to the first comparator. An adjustable setpoint value can be fed to the second input of the first comparator. The first comparator comprises an output that is coupled to an input of the computing unit.

The output of the first comparator serves to adjust the period of time for which the controlled channel in the transistor is switched off. The control arrangement thus generates a control signal that switches the controlled channel of the transistor alternately between a state in which it has a low resistance and a state in which the value of its resistance is high.

The control arrangement is constructed in such a way that energy can be supplied to the primary side of the transformer during the switched-on phase, and energy can be removed from the secondary side of the transformer, most particularly during the switched-off phase. The first current thus flows into the primary side during the switched-on phase, and may increase as time passes. During the switched-off phase, on the other hand, the first current is practically non-existent, whereas a second current flowing in a secondary side of the transformer is relatively large. During the switched-on phase, the energy content of the transformer is largely given by the value of the first current, whereas during the switched-off phase, the same energy content in the transformer approximately yields the second current. The relationship of the second current at the start of the switched-off phase to the first current at the end of the switched-on phase depends on the ratio of the inductance of the primary side to the inductance of the secondary side, and thereby on the ratio of the number of windings on the primary side to the number of windings on the secondary side. The second current falls during the switched-off phase as time goes by. This may be caused by charging a further energy-storing component such as a capacitor, by ohmic losses, by losses in a subsequent rectifier, or by current drawn by a load.

The value of the first current at the start of the switched-on phase depends on the value of the second current at the end of the switched-off phase. Further, the value of the first current at the beginning of the switched-on phase depends on the inverse of the ratio of the inductance of the primary side to the inductance of the secondary side, and thus to the inverse of the ratio of the number of windings on the primary side to the number of windings on the secondary side. This is due to the fact that the energy stored in the transformer at the end of the switched-off phase is related to the magnitude of the second current, while at the start of the switched-on phase it is related to the magnitude of the first current.

If the charging process is to be efficient, it is favourable for the second current not to fall below a minimum value during the switched-off phase. The control arrangement is therefore designed to lower the duration of the switched-off phase so that the second current does not fall below the minimum value at the end of the switched-off phase. For this reason the comparator is configured to compare a value of the first current, or a value that can be derived from the value of the first current, with an adjustable setpoint. The control arrangement is configured to set a shorter switched-off period when the value of the first current, or the value that is derived from the value of the first current, falls below the adjustable setpoint. For this reason the control arrangement is designed to shorten the subsequent switched-off phase in comparison with the foregoing switched-off phase in such a case.

The control arrangement is configured to set a longer switched-off period if the value of the first current, or the value that is derived from the value of the first current, is larger than the adjustable setpoint. The control arrangement is therefore designed to lengthen the subsequent switched-off phase in comparison with the foregoing switched-off phase.

Switching the controlled channel of the transistor on and off can be a periodically repeating procedure, controlled by the control arrangement by means of the control signal. The duration of the switched-off phase depends on the value of the first current, or on the value that is derived from the value of the first current, and is adjusted by means of the arrangement disclosed here.

Consequently it is favourable for the control arrangement to ensure that the second current does not fall below an adjustable threshold. The duration of each switched-off phase is appropriately regulated by the control arrangement for this purpose.

In a further development, the control arrangement comprises a mean-value generator. The mean-value generator is connected between the first input of the control arrangement and the first input of the first comparator. The mean-value generator is configured to obtain a mean-value from the value of the first current during one switched-on phase and of at least one subsequent additional value of the first current occurring during the same switched-on phase.

The mean-value generator can be implemented as a low-pass filter, to which several sequential values of the first current are supplied during the switched-on phase. The low-pass filter favourably minimizes the effect of transients that can result from switching processes. The low-pass filter can be implemented as a passive or, alternatively, as an active low-pass filter.

The mean-value generator can, alternatively, be implemented as an integrator that integrates several sequential values of the first current during the switched-on phase. The integrator can be configured to integrate values of the first current during the entire switched-on phase. It can, alternatively, be designed only to use values after any switching transients have settled.

In a further development, the integrator can be designed to integrate for an adjustable period of time following an adjustable waiting period during which any transients are allowed to settle; the duration can be shorter than the expected duration of the switched-on phase minus the waiting time.

In one embodiment, the integrator is also designed as a hold element and is configured to maintain its output signal after the end of the integration until the start of the next integration.

In another embodiment, the control arrangement comprises a delay unit. The purpose of the delay unit is to determine the value of the first current in such a way that, through the use of the delay unit, the first current is not sampled until an adjustable delay period after the beginning of the switched-on phase has elapsed. The delay unit is connected between the first input of the control arrangement and the first input of the first comparator. The adjustable delay period can be 0. The adjustable delay period is favourably larger than 0, so that any transients that may be present at the start of the switched-on phase have time to settle before measuring the value of the first current.

In one embodiment, the delay unit comprises a sample-and-hold circuit. With the aid of this circuit the value of the first current, or of the value that is derived from the value of the first current, is determined after an adjustable delay following the start of the switched-on phase, and is maintained until a new value is obtained in the subsequent switched-on phase.

In a further development, the computing unit comprises a microcontroller.

In another embodiment, the computing unit comprises several interconnected digital gates to provide the alternating control signals for the switched-on phase and for the switched-off phase with the controlled switched-off duration.

In a further embodiment, the computing unit comprises analog gates as well as digital gates. Analog gates can provide a control signal during the switched-on phase with an adjustable value of voltage or current. As an alternative, or in addition, analog gates can provide a control signal during the switched-off phase with an adjustable value of voltage or current. Analog gates can be provided to implement the durations of the switched-on and switched-off phases.

In a further embodiment, the computing unit is configured to apply additional processing to a first signal that can be accessed at the output of the first comparator. The computing unit is designed to find the duration of the next switched-off phase, or a value that represents the duration of the switched-off phase, on the basis of the first signal.

In an alternative embodiment, the control arrangement comprises an analog regulator whose input is coupled to the output of the first comparator, and whose output is coupled to an input of the computing unit. The analog regulator has the task of determining a first signal that represents the switched-off duration. The setpoint of the control loop is the adjustable setpoint that is supplied to the second input of the first comparator. The control loop comprises the analog regulator, the computing unit, the controlled channel in the transistor, the transformer, the means of sensing a first current and the first comparator, whose output is coupled to the analog regulator to close the control loop. The mean-value generator, the delay unit or the integrator can be arranged between the means of sensing a first current and the first comparator.

The analog regulator can be implemented as a proportional regulator, abbreviated to P-regulator. Alternatively, the analog regulator can be implemented as a proportional-integral regulator, abbreviated to PI-regulator. In another embodiment, the analog regulator can be implemented as a proportional-integral-differential regulator, abbreviated to PID regulator.

One terminal of the control arrangement may be connected to a power supply terminal, while a further terminal may be connected to a reference potential terminal. In one embodiment, the power supply potential terminal may be coupled to a battery.

The duration of the switched-on phase can be a constant, adjustable value.

In a further development, the control arrangement is configured in such a way that the transistor is switched from the switched-on phase into the switched-off phase as soon as the first current, or the value derived from it, in the switched-on phase falls below an adjustable limiting value. This favourably means that the magnitude of the first current can be limited, so limiting the power drawn from a battery and the energy content of the transformer.

In one embodiment of this further development, the control arrangement comprises a second comparator, whose output is connected to a further input on the computing unit. The first input of the comparator is connected to the first input of the control arrangement. The value of the first current, or a value derived from the value of the first current, is therefore supplied to the first input of the comparator. The adjustable current-limiting value can be applied to the second input of the comparator. At its output, the comparator provides a signal that is formed in accordance with the value of the first current, or of the value derived from the first current, and with the adjustable current limiting value. It is thus favourably possible to configure the control arrangement in such a way that the switched-on phase is ended once the current-limiting value is reached. Favourably, provided the secondary side is idling during the switched-on phase, the transformer can always have the same energy content at the end of the switched-on phase.

In a further development, the control arrangement comprises a second input. The second input is configured for the supply of the second voltage, obtainable across a first and a second primary terminal of the transformer. Alternatively, the control arrangement is configured for the supply of a further voltage, derived from the second voltage, at the second input.

The primary side of the transformer that is used to convert the first DC voltage into the second DC voltage can be connected to the control arrangement. The second DC voltage can thus be a voltage that appears at the secondary side when in operation. In a further development, the control arrangement is designed to lengthen the switched-off phase of the transistor by an adjustable additional duration when the second DC voltage reaches a specified value. One advantage of this further development is that it limits the magnitude of the second DC voltage.

In one embodiment of this further development, the control arrangement is configured to lengthen the switched-off phase of the transistor by an adjustable additional duration if the second voltage, or the further voltage derived from the second voltage, reaches a first adjustable voltage value during the switched-off phase.

In one embodiment of the further development of the control arrangement with the adjustable additional duration, the control arrangement comprises a third comparator. A first input of the third comparator is connected to the second input of the control arrangement. The first adjustable voltage value can be fed to a second input of the third comparator. An output of the third comparator is connected to the computing unit, and is designed to output a third signal. The third signal is used to lengthen the switched-off phase by the adjustable additional duration depending on the comparison between the second voltage, or the voltage derived from the second voltage, and the first, adjustable voltage value.

In a further development, the control arrangement is designed to adjust a resistance value of the controlled channel of the transistor during the transition from the switched-on to the switched-off phase. The control arrangement is designed to set the resistance value in such a way that the second voltage, or the voltage derived from the second voltage, does not exceed a second, adjustable voltage value. It is favourably possible in this way to reduce the possibility that the voltage converter presents a risk to voltage-sensitive components or to persons through excessively high voltage with, moreover, a high rate of rise.

In one embodiment of this further development, the control arrangement comprises a fourth comparator for this purpose. A first input of the fourth comparator is connected to the second input of the control arrangement. The second adjustable voltage value is fed to a second input of the fourth comparator. An output of the fourth comparator is connected to the computing unit in such a way that the resistance value of the transistor can be regulated depending on the comparison between the second voltage, or the voltage derived from the second voltage, with the second, adjustable voltage limit value.

In an alternative embodiment of this further development, the second adjustable voltage limit value has the same value as the first, adjustable voltage limit value, which permits the third comparator to be employed to implement this further development. In this alternative embodiment it is favourably possible to omit the fourth comparator.

The first and/or the second and/or the third and/or the fourth comparator can be implemented in such a way as to provide digital outputs or, alternatively, signal outputs that have values corresponding to 1, −1 and 0. The first and/or the second and/or the third and/or the fourth comparator can be implemented as integrated circuit comparators.

In a favourable embodiment, the first and/or the fourth comparator is designed to provide an analog signal as an output, representing the difference between the signals at its first and second inputs. The first and/or fourth comparator can, for this purpose, be implemented by differential amplifiers. In this way the first signal and/or the fourth signal can be supplied to the computing unit in analog form, and employed for precise regulation of the control signal.

In one embodiment the computing unit is designed in such a way that it generates a control signal that switches the transistor off with a low edge gradient. The computing unit can comprise a low-pass filter for this purpose to affect the time constant of the switch-off process. The low-pass filter can also, favourably, be incorporated to slow up the switch-on process. This favourably reduces interfering radiation generated by switching on and off. The low-pass network can be implemented as a resistor-capacitor network, or RC-network for short.

A voltage converter is provided in one embodiment of the proposed principle. The voltage converter comprises the transformer, the transistor, the means of sensing a first current, a rectifier circuit and the control arrangement. The rectifier circuit is coupled to a secondary side of the transformer. The second DC voltage, i.e. an output voltage from the voltage converter, can be accessed at the output of the rectifier circuit. The first output of the control arrangement is connected to the control terminal of the transistor.

In one embodiment, the means for sensing a first current consists of a first resistor, connected in series with the transformer and the transistor. The first input to the control arrangement is connected to one terminal of the first resistor. The resistance value of the first resistor is favourably selected to have a sufficiently low value for ohmic losses to be small.

In one embodiment the rectifier circuit comprises a diode and a capacitor connected together in series. The series network consisting of the diode and capacitor is connected to a first and to a second secondary-side terminal of the transformer. The second DC voltage can be accessed across the capacitor. Due to the high costs of components that are suitable for use with high voltages, it is favourable if the number of components in the rectifier circuit can be kept small.

In one favourable embodiment, the diode of the rectifier circuit is connected to the first and second terminals of the secondary side of the transformer in such a way that the second current flows through the diode in the forward direction, particularly during the switched-off phase.

In a further development, the rectifier circuit comprises a bridge rectifier or a centre-tapped circuit. It is an advantage of this further development that the bridge rectifier circuit and the centre-tapped circuit have symmetrical structures, as a result of which the terminals of the rectifier circuit can be connected to the first and second secondary terminals of the transformer with either polarity.

The transistor can be implemented as an analog switch or as an electronic switch.

The transistor can be implemented as a bipolar transistor. In another embodiment, the transistor is implemented as a field-effect transistor. In a further development, the transistor is implemented as an N-channel field-effect transistor. In a favourable implementation, the transistor is implemented as an N-channel metal-oxide-semiconductor field-effect transistor.

In one embodiment the control arrangement is integrated onto one semiconductor chip. Specialized manufacturing technologies can therefore be used to implement the control circuit and to implement the transistor. The transistor can be implemented using a power-transistor technology.

In another embodiment, the transistor is implemented together with the control arrangement onto one semiconductor chip. An advantage of this embodiment is that the total number of connections to the voltage converter is reduced, and that the control arrangement can be specifically dimensioned for the transistor provided on the same chip.

The voltage converter can be used to generate a higher voltage. In one example of an implementation the higher voltage can be between 100 and 400 V.

In one example embodiment, the transformer can have a turns ratio between 1:20 and 1:100.

The voltage converter can favourably be used to generate a voltage for operating a xenon lamp.

The voltage converter can favourably be used in a device for mobile communication technology.

The voltage converter can be used with particular advantage in a device for mobile communication technology in order to provide a higher voltage for a flashlight.

The voltage converter can favourably be employed in a digital camera.

In terms of the method, the task is fulfilled by a procedure for converting a first DC voltage into a second DC voltage, involving the following steps:

For the duration of the switched-on phase, a first DC voltage is fed to the primary side of the transformer, in order to store energy in the transformer. For this purpose a transistor is driven into a low-resistance state. The transistor is connected in one of the feed lines supplying the first DC voltage to the primary side of the transformer. A first current flows through the primary side of the transformer.

For the duration of a phase when the transistor is switched off, energy is output from a secondary side of the transformer. For this purpose the transistor is driven into a high-resistance state. The duration of the switched-off phase is determined from the value of the first current in the switched-on phase, or from a value that can be derived from the value of the first current during the switched-on phase. The second DC voltage is generated by rectifying a second current that is output from the secondary side of the transformer.

The duration of the switched-off phase can thus favourably be adjusted by making reference to magnitudes that are available on the primary side. An advantage of this method is that secondary-side magnitudes do not need to be accessed in order to control the transistor.

An alternative embodiment of a method for converting a first DC voltage into a second DC voltage in accordance with the proposed principle comprises the following steps:

A first current that flows through a primary side of the transformer is periodically switched on and off, the first current is measured while the first current is switched on, a duration of the switched-off phase is controlled depending on the measurement, a second current that flows through a secondary side of a transformer is rectified.

In summary, the proposed principle has the following advantages:

The control arrangement does not need to be connected to the secondary side of the transformer in order to obtain input signals for control purposes.

Nor does the voltage converter incorporate any conductive connections between the secondary and primary sides of the transformer. The only connection between the secondary and primary sides is inductive coupling through the transformer.

The reference potential on the secondary side of the transformer can thereby, if desired, be entirely independent of the reference potential on the primary side of the transformer.

The voltage converter only requires a few components to create the circuits for the control arrangement and the transformer.

Only a small number of connections need to be made to the control arrangement.

Indirectly measuring the current on the secondary side of the transformer by means of a signal on the primary side of the transformer enables a fast charging time to be achieved. This can be done without sensing the current on the secondary side.

Embodiments are explained in more detail below through several examples and with the aid of the figures. Components that have the same function or effect are given the same reference codes. To the extent to which the components have identical functions, their description is not repeated in every one of the following figures.

DETAILED DESCRIPTION

Figure 1A:
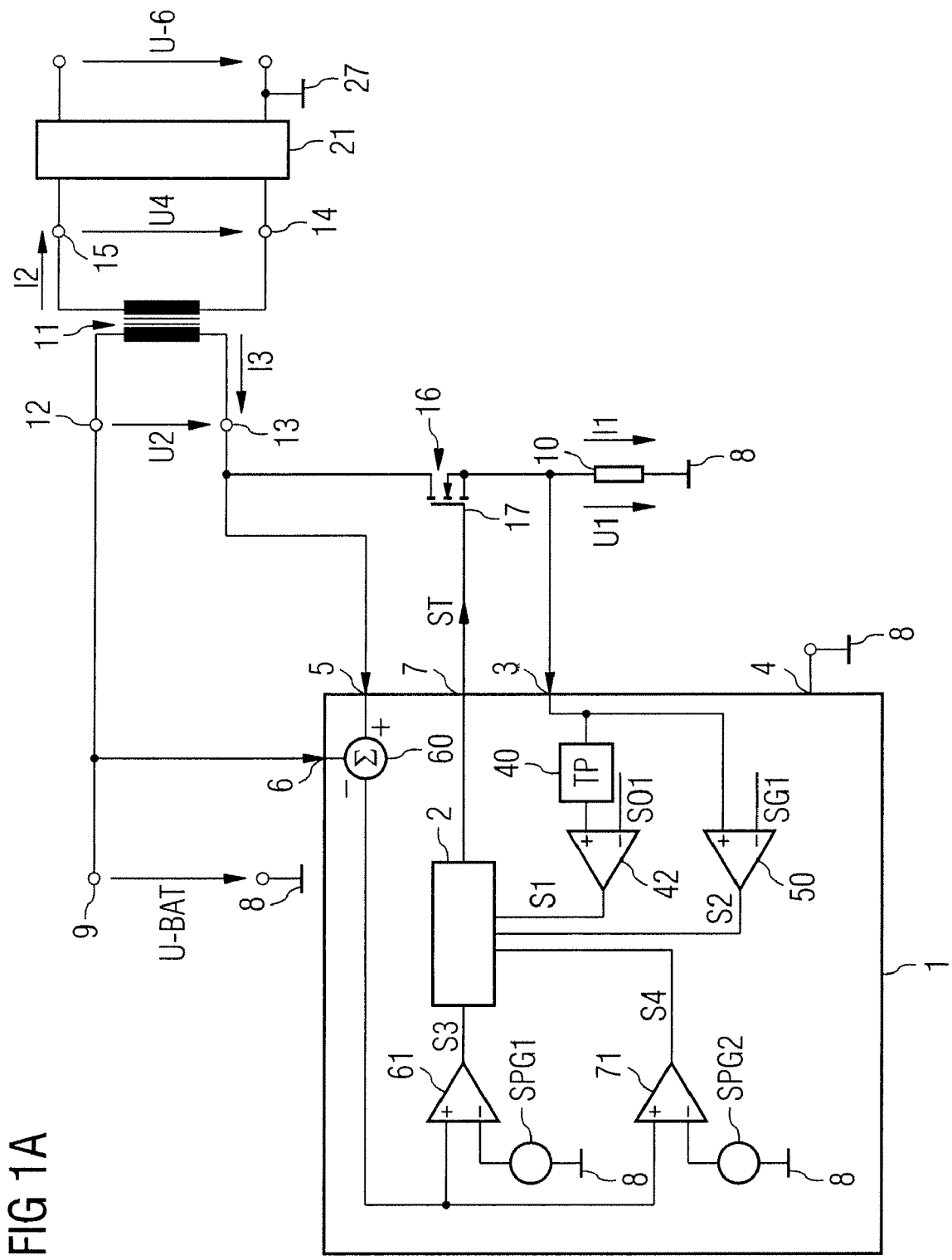
FIGS. 1A and 1B each show examples of a voltage converter according to the proposed principle.

FIG. 1A shows an example of an embodiment of the voltage converter with a control unit according to the proposed principle. The voltage converter comprises a transformer 11, the control arrangement 1, a rectifier 21, and further components connected between a primary side of the transformer 11 and the control arrangement 1.

The primary side of the transformer 11 has a first primary terminal 12 and a second primary terminal 13. The primary side of the transformer 11 is connected in series with a controlled channel of a transistor 16 and a first resistor 10. The first primary terminal 12 of the transformer 11 is connected to a power supply terminal 9. A first terminal of the first resistor 10 is connected to the transistor 16, and a further terminal is connected to the reference potential terminal 8. The transistor 16, in the example embodiment according to FIG. 1A, is implemented as an enhancement-mode N-channel metal-oxide-semiconductor field-effect transistor.

One output 7 of the control arrangement 1 is connected to a controlling input 17 of the transistor 16. A node between the transistor 16 and the first resistor 10 is connected to a first input 3 of the control arrangement 1. A node between the transistor 16 and the primary side of the transformer 11 is connected to a second input 5 of the control arrangement 1. A third input 6 of the control arrangement 1 is connected to the power supply terminal 9. A fourth input 4 of the control arrangement 1 is connected to the reference potential terminal 8.

The control arrangement 1 comprises a low-pass filter 40, whose output is connected to a first comparator 42. The input of the low-pass filter 40 is connected to the input 3 of the control arrangement 1. An adjustable setpoint value SO1 is fed to a second input of the first comparator 42. An output from the first comparator 42 is connected to an input of a computing unit 2. The output from the computing unit 2 is connected to the output 7 of the control arrangement 1.

A first input of a second comparator 50 is connected to the first input 3 of the control arrangement 1. A value for the current limit SG1 is supplied to a second input of the second comparator 50. The output of the second comparator 50 is connected to a further input of the computing unit 2.

The control arrangement 1 also comprises a subtraction unit 60 whose first input is connected to a third input 6 of the control arrangement 1, and whose second input is connected to the second input 5 of the control arrangement 1. An output of the subtraction unit 60 is connected to a first input of the third comparator 61. A first adjustable voltage limit value SPG1 is applied to the second input of the third comparator 61. An output of the third comparator 61 is connected to a further input of the computing unit 2.

An output of the subtraction unit 60 is also connected to a first input of a fourth comparator 71. A second, adjustable voltage limit value SPG2 is applied to a second input of the fourth comparator 71. An output of the fourth comparator 71 is connected to a further input of the computing unit 2.

The transformer 11 comprises a first and a second secondary terminal 14, 15. A rectifying circuit 21, having two inputs and two outputs, is connected to the secondary side of the transformer 11. One output of the rectifier 21 is connected to a further reference potential terminal 27. The reference potential terminal 8 and the further reference potential terminal 27 are not connected in the voltage converter that accords with FIG. 1A. The primary and secondary sides are therefore electrically isolated from one another.

A first DC voltage UBAT is applied to the voltage converter at the power supply terminal 9.

During a switched-on phase, the transistor 16 is driven into a low-resistance state. During the switched-on phase, input 17 of the transistor 16 is supplied with a control signal ST that is higher than a positive threshold voltage, since the transistor is implemented as an enhancement mode N-channel metal oxide-semiconductor field-effect transistor.

During the switched-on phase, a first current I1, driven by the first DC voltage UBAT, flows from the power supply terminal 9 through the primary side of the transformer 11, through the transistor 16 and then through the first resistor 10 to the reference potential terminal 8. The following equation therefore approximately describes the switched-on phase:

$$UBAT = U2 + UDS + U1,$$

where UBAT is the first DC voltage, U2 a second voltage dropped between the first and second primary terminals 12, 13 of the transformer 11, UDS is a voltage across the controlled channel of the transistor 16, and U1 is a voltage dropped across the first resistor 10.

During the switched-on phase, the voltage U2 when the secondary side is idle can be calculated approximately from the following equation:

$$U2 = L_{11} \cdot \frac{dI1}{dt},$$

where U2 is the voltage across the primary side, L11 is the inductance of the primary side, and I1 is the current flowing through the primary side of the transformer 11. This condition can be satisfied during the switched-on phase, because the second current I2 can have a value of practically 0 during the switched-on phase, depending on the rectifier circuit 21 that is connected.

The voltage U1 can be calculated from the following equation:

$$U2 = I1 \cdot R10,$$

where U1 is the voltage across the first resistor 10, R10 is the value of the resistance of the first resistor 10, and I1 is the current flowing through the primary side of the transformer 11 and through the first resistor 10.

The first voltage U1 is thus a measure for the current I1 flowing through the primary side of the transformer 11 during the switched-on phase. The first voltage U1 is applied to the first input 3 of the control arrangement 1. The low-pass filter 40 is designed in such a way that it generates a mean of sequential values of the first voltage U1 during the switched-on phase. This mean value is then compared with the adjustable setpoint value SO1 by the first comparator 42. A first signal S1 is provided by the output of the first comparator 42, and is supplied to the computing unit 2. If the mean value is smaller than the setpoint value SO1, the computing unit 2 will make the duration of the subsequent switched-off phase T-OFF shorter than its duration in the previous switched-off phase. If the mean value is larger than the setpoint value SO1, the computing unit 2 will make the duration of the subsequent switched-off phase T-OFF longer than its duration in the previous switched-off phase. If the subsequent switched-off phase is the first switch-off phase following the commencement of operation of the voltage converter, an adjustable start time for the duration of the switched-off period T-OFF can be supplied to the computing unit 2, which the computing unit 2 can lengthen or shorten, as described, by means of the first signal S1 occurring during the first switched-on phase.

The first current I1 rises during the switched-on phase. The first voltage U1 is supplied to the second comparator 50 as a measure of the first current I1. The second comparator 50 provides a second signal S2 at its output, and this is supplied to the computing unit 2. If the first current I1 exceeds the adjustable current limiting value SG1, or if the first voltage U1 exceeds a corresponding voltage limit value, the computing unit 2 is driven by means of the second comparator 50 and the second signal S2 in such a way that it generates a control signal ST for switching the transistor 16 from its low-resistance state into the high-resistance state, so switching the controlled channel of the transistor 16 from the switched-on phase into the switched-off phase.

The primary side is idle during the switched-off phase. When one side of a transformer is idle, the voltages on the primary and secondary sides can be approximately calculated from the following equation:

$$U4/U2 = W2/W1,$$

where U2 is the voltage on the primary side of the transformer 11, U4 is a voltage on the secondary side of the transformer 11, W1 the number of the windings on the primary side of the transformer 11, and W2 the number of the windings on the secondary side of the transformer 11.

Because the primary side is idle, the value of the fourth voltage U4 during the switched-off phase can approximately be determined from the value of the second voltage U2 by means of the above equation. The subtraction unit 60 in the control arrangement 1 compares a potential at the second input 5 with a potential at the third input 6 of the control arrangement 1 for this purpose. The negative value of the second voltage U2 that is found between the first and second terminals of the primary side is thus available at the output of the subtraction unit 60.

The second voltage U2 can adopt negative values at the beginning of or during the switched-off phase. The connection of the subtraction unit 60 to the second and third inputs 5, 6 is selected in such a way that a positive voltage can be obtained from its output.

The second voltage U2 is compared by the third comparator 61 with the first adjustable voltage limit value SPG1. The first adjustable voltage limit value SPG1 can have a positive sign. The third signal S3 occurring at the output of the third comparator 61 is supplied to the computing unit 2. If the magnitude of the second voltage U2 is greater than that of the first adjustable voltage limit value SPG1, the computing unit 2 is driven by means of the third comparator 61 and the signal S3 in such a way that it lengthens the switched-off phase by an adjustable duration T-R. A further switched-on phase follows the end of the lengthened switched-off phase. This means that the second DC voltage U-G has reached a maximum value. In the example of a voltage converter according to FIG. 1A, the duration of the extension T-R is longer than the duration of the switched-off phase T-OFF.

If the magnitude of the second voltage U2 is smaller than the first adjustable voltage limit value SPG1, the switched-off phase will be ended by the computing unit 2 by means of the control signal ST after the switched-off duration T-OFF determined during the foregoing switched-on phase has elapsed. This is done by the control signal ST, which switches the transistor 16 from the high-resistance into the low-resistance state.

In the switched-off phase, the voltage U4 on the secondary side of the transformer 11 is converted into the second DC voltage U-G. The second DC voltage UG is available at two outputs of the rectifier circuit 21.

Switching transistor 16 off very quickly can lead to excessive voltage between the first and second primary terminals 12, 13 of the transformer 11. The control arrangement 1, with the aid of the second voltage U2 that is present at the second and third inputs 5 and 6, of the subtraction unit 60 and of the fourth comparator 71, monitors the voltage at the primary side of the transformer 11. The fourth comparator 71 supplies a fourth signal S4 if the magnitude of the second voltage U2 exceeds a second, adjustable voltage limit value SPG2. The fourth signal S4 drives the computing unit 2 in such a way that it generates a control voltage ST that regulates the transistor 16 during the switched-on phase in such a way that excessive voltage cannot occur on the primary side. This can favourably reduce the hazard for components or for persons arising from excessive voltage or from an excessively fast rate of voltage rise.

In one embodiment, the voltage drop U1 across the first resistor 10 can be taken into account in the generation of the control signal ST.

It is an advantage of the control arrangement 1 and of the voltage converter in accordance with FIG. 1A that only voltages and currents on the primary side of the transformer 11 are used to control the various phases of the rectification process. The switched-off duration T-OFF is favourably determined through the first signal S1, so optimizing the duration of the entire charging process. The first current I1 is favourably limited by means of the second signal S2, so that the power consumed by the voltage converter and the power drawn from the supply circuits are not too large. A further advantage of limiting the current is that the windings of the transformer 11 do not become too hot. By means of the third signal S3 the switched-off duration T-OFF is significantly lengthened, so favourably avoiding the generation of an excessively high second DC voltage U-G, and improving the efficiency with which the energy is exploited. The fourth signal S4 regulates the switching off in such a way that excessive voltages are favourably avoided.

The reference potential terminal 8 and the further reference potential terminal 27 can be connected together.

Figure 1B:
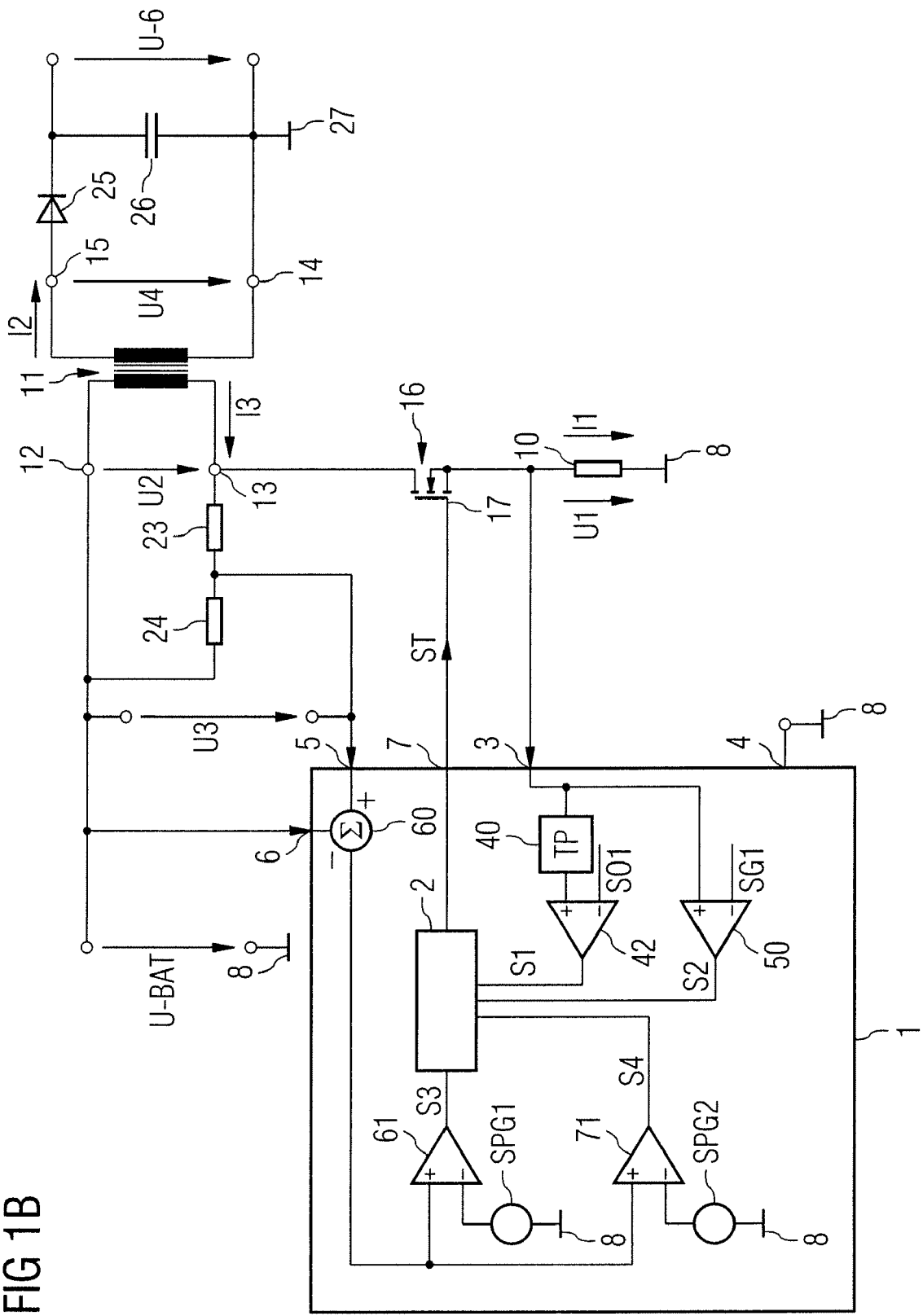

FIG. 1B illustrates an example of a further development of the voltage converter in accordance with FIG. 1A.

The rectifier circuit 21 incorporates a series circuit comprising a diode 25 and a capacitor 26. The two electrodes of the capacitor 26 are connected to two terminals used to obtain the second DC voltage U-G. The diode 25 is wired in such a way that it is conductive during the switched-off phase. For this reason, the anode of the diode is connected to a second secondary terminal 15 of the transformer 11. A first secondary terminal 14 of the transformer 11 is connected to one of the two electrodes of the capacitor 26.

A node between the capacitor 26 and the first secondary terminal 14 of the transformer 11 is connected to the additional reference potential terminal 27. In the voltage converter according to FIG. 1B, the additional reference potential terminal 27 is separate from the reference potential terminal 8.

A second resistor 23 is wired between the second primary terminal 13 and the second input 5 of the control arrangement 1. A third resistor 24 is provided between the supply potential terminal 9 and the second input 5 of the control arrangement 1.

The voltage U4 appearing at the secondary side of the transformer 11 is applied to the series circuit consisting of the diode 25 and the capacitor 26. The anode of the diode 25 is connected to one of the two secondary terminals 14, 15 of the transformer 11 in such a way that the second current I2 can flow through the diode 25 during the switched-off phase. The capacitor 26 is charged by the second current I2, so generating the second DC voltage U-G.

The effect of the series wiring of the second resistor 23 and the third resistor 24 is that the current I3 flowing through the primary side of the transformer 11 during the switched-off phase is not zero. The current I3 can flow back through the series network consisting of the second and third resistors 23, 24 from the second primary terminal 13 to the first primary terminal 12. A voltage U3, which can be derived from the second voltage U2, can thus be taken from between the third terminal 6 and the second terminal 5. Over-voltage at the primary terminal arising during the transition between the switched-on and switched-off phases can favourably be reduced by means of the second and third resistors 23, 24.

A current also flows through the series circuit during a switched-on phase. The sum of the resistance values of the second and third resistors 23, 24 is favourably selected to have a sufficiently high value that ohmic losses are small.

The second resistor 23 favourably serves to protect the second input 5 of the control arrangement 1 from exposure to excessive voltage.

It is an advantage of the rectifier circuit 21 that only two components are required to implement it. This is particularly advantageous to voltage converters used to generate relatively high voltages, as components that can withstand high voltage are more difficult to implement.

Figure 2A:
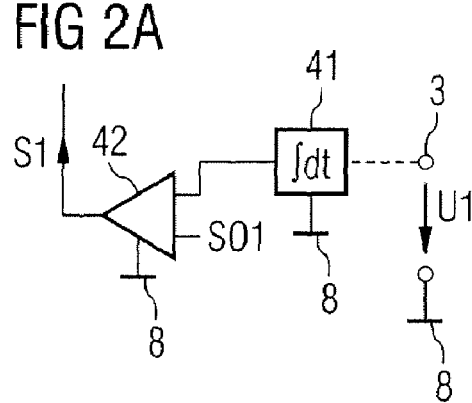
FIGS. 2A to 2E illustrate examples of embodiments of part of the control arrangement.

FIG. 2A illustrates an alternative embodiment of a circuit that is connected to the first input 3 of the control arrangement 1, and that generates a first signal S1 that is supplied to the input of the computing unit 2. In accordance with the control arrangement 1 in FIGS. 1A and 1B, a low-pass filter 40 and a first comparator 42 are provided.

In the alternative embodiment in accordance with FIG. 2A, as may be used in a control arrangement 1 in accordance with FIGS. 1A and 1B, the low-pass filter 40 of FIGS. 1A and 1B is replaced by an integrator 41. It is configured to integrate only values of the first voltage U1 during the switched-on phase. It is, furthermore, configured to be reset to 0 during the switched-off phase.

Figure 2B:
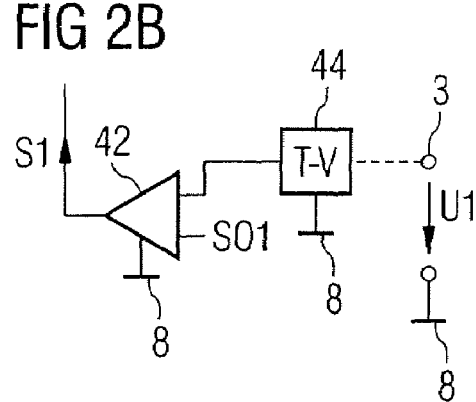

FIG. 2B illustrates a different, alternative embodiment of the circuit above in accordance with FIG. 2A. In the circuit arrangement according to FIG. 2B, the low-pass filter 40 of FIGS. 1A and 1B is replaced by a delay unit 44. The effect of this is that a value for the first voltage U1, delayed by an adjustable period T-V with respect to the start of the switched-on phase, is supplied to the first input of the first comparator 42. The delay unit 44 favourably incorporates a sample-and-hold circuit.

Figure 2C:
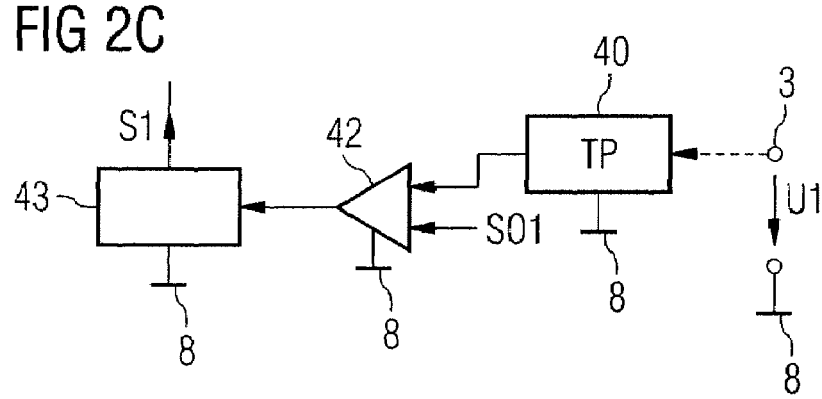
Figure 2D:
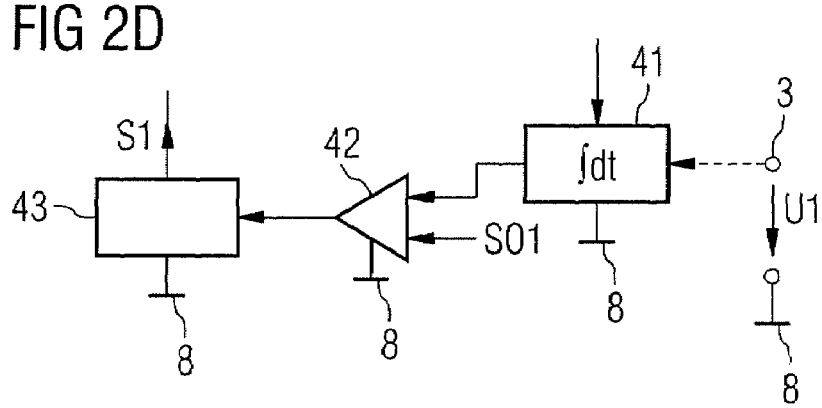
Figure 2E:
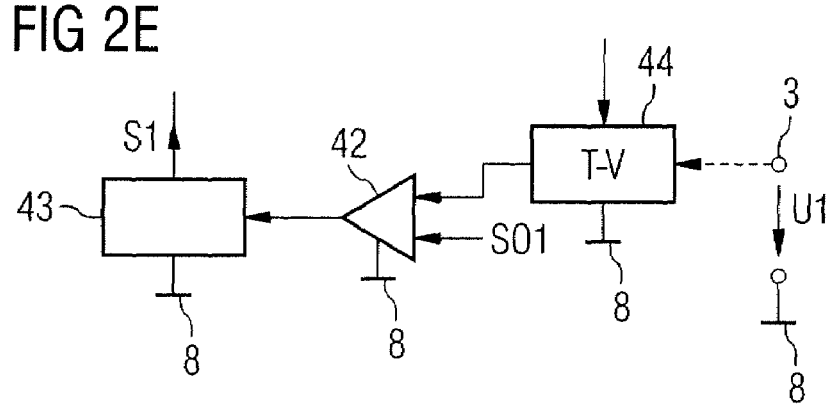

FIGS. 2C to 2E incorporate, in addition to the embodiments illustrated so far in FIGS. 1A and 1B and in FIGS. 2A and 2B, an analog regulator 43 connected between the output from the first comparator 42 and an input of the computer unit 2. In FIG. 2C, the first input of the comparator 42 is preceded by the low-pass filter 40, in FIG. 2D by the integrator 41, and in FIG. 2E by the delay unit 44.

The signal S1 can be obtained from an output from the analog regulator 43, representing the duration of the switched-off phase T-OFF in the embodiments according to FIGS. 2C to 2E. This takes a load off the computing unit 2, as the analog regulator 43 performs the regulation tasks.

Figure 3:
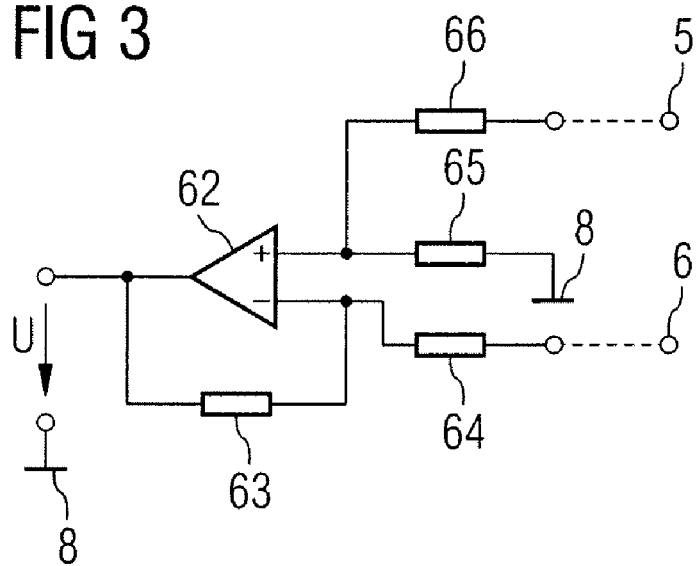
FIG. 3 illustrates an example of an embodiment of a subtraction network.

FIG. 3 illustrates an example of embodiment of a subtraction unit 60, as can be used in the control arrangement 1 according to FIGS. 1A and 1B.

The subtraction unit in the circuit arrangement according to FIG. 3 incorporates an operational amplifier 62. A non-inverting input of the operational amplifier 62 is joined through a resistor 66 to the second input 5 of the control arrangement 1. The non-inverting input of the operational amplifier 62 is connected through a resistor 65 to the reference potential terminal 8.

An inverting input of the operational amplifier 62 is joined through a resistor 64 to the third input 6 of the control arrangement 1. The inverting input of the operational amplifier 62 is connected via a resistor 63 to the output of the operational amplifier which thereby forms the output of the subtraction unit 60.

If the four resistors have the same value of resistance, a voltage at the output is approximately the same as the difference between the voltages at the two inputs 5, 6.

If, alternatively, the resistance value of the resistor 66 differs from that of the resistor 65 by a factor k, and if the ratio between the resistance values of resistor 64 to that of resistor 63 has the same factor k, then the voltage at the output is approximately equal to the difference of the voltages at the two inputs 5, 6, divided by the factor k. The factor k, which is greater than 1, can thereby favourably reduce a high voltage difference between the voltages at the second and third inputs 5, 6. A voltage difference appearing between the second input in the third input 6 of the control arrangement 1 is thereby favourably processed in such a way that it is available between the output of the operational amplifier 62 and the reference potential 8, and is therefore easily given further processing.

Figure 4:
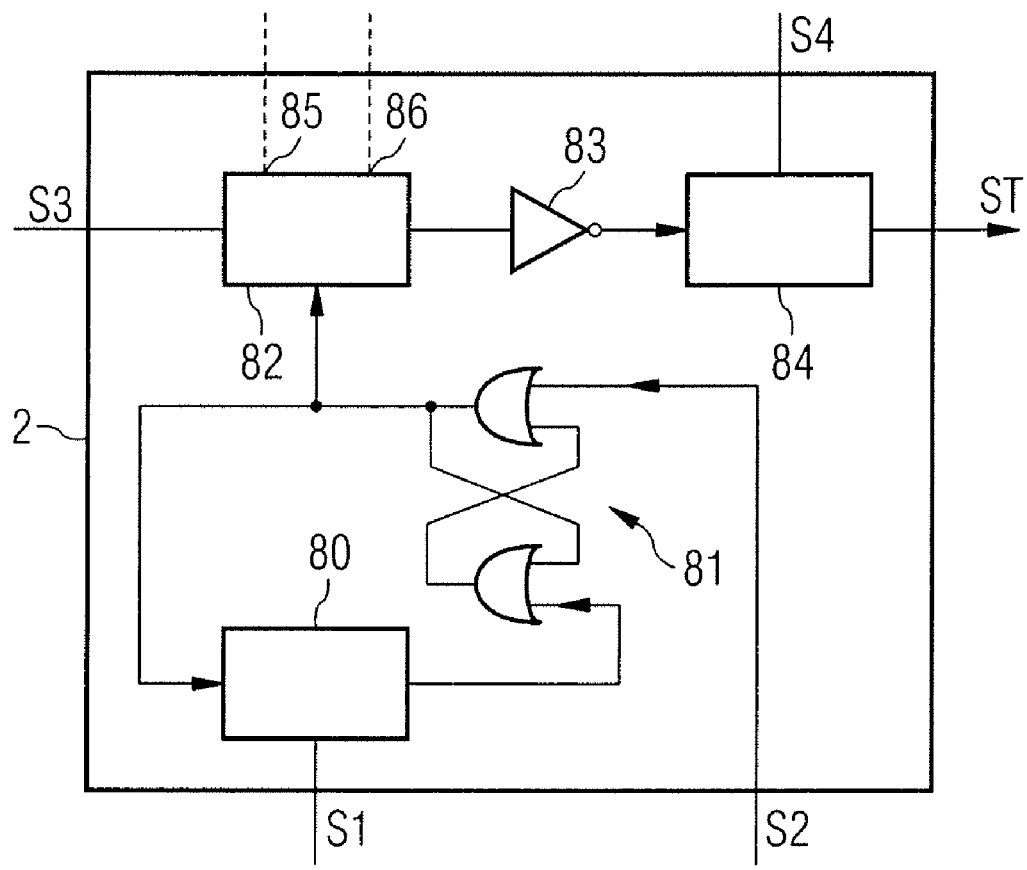
FIG. 4 illustrates an example of an embodiment of a computing unit.

FIG. 4 illustrates an example of an embodiment of a computing unit 2, as can be used in the control arrangement 1 according to FIGS. 1A and 1B.

The computing unit 2 comprises an over-voltage protection circuit 82, whose output is connected via an inverter 83 to a drive circuit 84. The input of the over-voltage protection circuit 82 is connected to an output of a flip-flop. The output of the flip-flop 81 is connected via a delay circuit 80 to the first input of the flip-flop 81. In the present embodiment, the flip-flop is formed of two interconnected OR-gates.

The first, second, third and fourth signals S1 to S4 are taken to the computing unit 2. The computing unit 2 therefore has four control inputs. The first control signal S1 is fed to the delay circuit 80, and is used to adjust the duration of the switched-off phase T-OFF. In the example embodiment of the computing unit 2, a first value of the first control signal S1 lengthens the duration of the switched-off period T-OFF for the following cycle; a second value of the control signal S1 shortens the duration of the switched-off phase T-OFF for the following cycle. The first value is a high value, while the second value is low.

The second control signal S2 is supplied to a second input of the flip-flop 81, and is used to end the switched-on phase. The duration of the switched on phase T-ON is thus determined by the second control signal S2.

The signal at the output of the flip-flop 81 is thus fed to one input of the delay circuit 80 and to an input of the over-voltage protection circuit 82. The third control signal S3 is fed to a further input of the over-voltage protection circuit 82. The third control signal S3 serves to lengthen the duration of the switched-off phase by an adjustable time T-R.

A signal that is present as an output of the over-voltage protection circuit 82 and is processed by the inverter 83 is applied to a first input of the driver circuit 84. The control signal ST is available at an output of the driver circuit 84. The driver circuit 84 provides an analog signal at its output, and this signal places the transistor 16 into a low-resistance state during the switched-on phase and into a high-resistance state during the switched-off phase in accordance with the transistor's properties.

In this example the fourth signal S4 is supplied to a second input of the driver circuit 84. The fourth control signal S4 is used to adjust the resistance value of the controlled channel in the transistor 16 during the transition between the switched-on and switched-off phases. The resistance of the controlled channel is thus only increased slowly.

It is thus favourably possible by means of the computing unit 2 to modify both the duration of the switched-off phase and that of the switched-on phase, as well as the value of resistance of the transistor in the various phases.

The switched-on phase is favourably ended when the first current becomes too large. The switched-off phase is also favourably shortened if it is found from a value of the first current I1 that the second current I2 is too small at the end of the switched-off phase. This shortening favourably reduces the total time required to generate the second DC voltage U-G. The switched-off phase is lengthened by the duration T-R in dependency on the third signal S3, so favourably drawing less energy from a battery that is connected to the power supply terminal 9.

The over-voltage protection circuit 82 can, optionally, be constructed in such a way that the duration of the extension T-R can be adjusted by means of the additional input 85 of the over-voltage protection circuit 82. The further input 85 of the over-voltage protection circuit 82 is connected to a further input of the control unit 1.

The over-voltage protection unit 82 can, optionally, offer a further input 86 used to obtain information to the effect that because of an event the transition should be made to the switched-on phase before the lengthened duration T-R has completed. An event of this type could be, for instance, the emission of a flash from a light source that is briefly connected to the second DC voltage. In cases where, as the result of an event, the second DC voltage drops, the control arrangement 1 favourably begins the switched-on phase before the lengthened duration T-R has finished.

Figure 5:
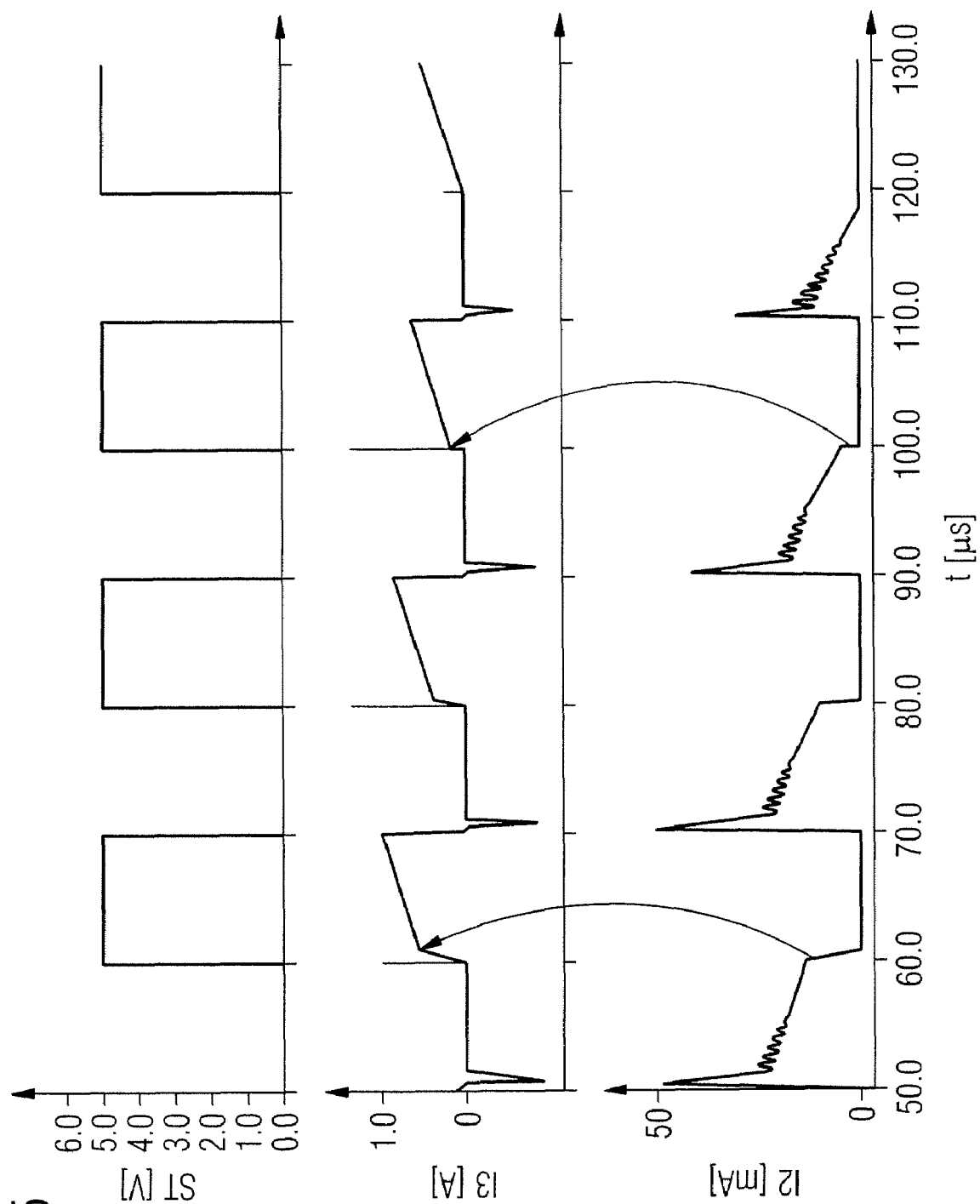
FIG. 5 illustrates examples of signal curves found in a voltage converter.

FIG. 5 illustrates signal curves associated with a voltage converter according to a simulation.

The signals are shown against time t. The upper curve shows the control signal ST in volts. In FIG. 5 the signal is shown being switched on and off with a period of 20 μs. The switched-on duration T-ON and the switched-off duration T-OFF are both set at a fixed 10 μs. FIG. 5 thus illustrates the behaviour of a voltage converter with a structure similar to the voltage converter according to FIG. 1B, with the regulation switched off.

The central curve illustrates a current I3 flowing through the primary side of the transformer 11. While the control signal is at 0 V, the voltage converter is in the switched-off phase, and the current I3 is, apart from a current peak after switching off, approximately 0. At the beginning of the switched-on phase the current I3 features a short spike, followed by a rapid, steep rise to a first value of the current. After reaching his first value, the current I3 undergoes an approximately linear rise. At the end of the switched-on phase, and therefore at the beginning of the switched-off phase, the current falls, after the spike at switch-off, to 0.

The lower curve shows the second current I2 in amps, flowing in the secondary side of the transformer 11, against time t. At the beginning of the switched-off phase, the current I2 in the simulation demonstrates a spike, followed by a few oscillations. The second current I2 then undergoes an approximately linear rise with time t. At the end of the switched-off phase, the second current I2 in three of the four switched-off phases illustrated still has a residual magnitude.

The residual current indicates that the transformer 11 still contains magnetic energy at the end of the switched-off phase. For this reason, the current I3 does not start from 0 at the beginning of the switched-on phase, but at a higher value. This happens because the current I3 at the beginning of the switched-on phase reflects the energy contained in the transformer. To achieve high efficiency in the voltage conversion, it is advantageous to adjust the second current I2 in such a way that it still has a magnitude greater than 0 at the end of the switched-off phase, so that the transformer 11 is does still contains some magnetic energy at the end of the switched-off phase. The duration of the switched-off phase T-OFF is shortened for this purpose.

Because the voltage converter is designed to make use of magnitudes on the primary side, the second current I2 cannot be used directly for control purposes, and in one embodiment a single value of the current I3 is used to determine the second current I2 indirectly at the end of the switched-off phase. This is marked by the two arrows. It can, in one embodiment, be the value of the current I3 after the short pulse and after the rapid, steep rise at the beginning of the switched-on phase that is adjusted.

For the sake of clarity, the simulation of the signal curves in FIG. 5 does not involve regulation of the durations of the switched-on and switched-off phases T-ON, T-OFF, in contrast to the principle illustrated in FIGS. 1A, 1B and 4. Because the duration of the switched-on phase T-ON is not regulated, the current I3 rises during the switched-on phase to different values, depending on the duration of the switched-on phase. The switched-on phase is thus finished too quickly, at least in the last of the four illustrated switched-on phases.

Because the duration of the switched-off phase is also not regulated, the residual value of the second current I2 at the end of the switched-off phase varies from one period to another. This could be compensated for by a longer switched-on phase or by a shorter switched-off phase T-OFF.

FIG. 5 thus shows that regulation of the durations of the switched-on and switched-off phases T-ON, T-OFF is advantageous to the efficient use of energy in the voltage conversion process.

The invention claimed is:

1. A device comprising:
  a control arrangement for a voltage converter comprising:
    a first input electrically connected to a device configured to sense a first current in a primary side of a transformer, the transformer being configured to convert a first DC voltage into a second DC voltage,
    a first output electrically connected to a control terminal of a transistor, the transistor being electrically connected in series with the primary side of the transformer, the first output being configured to supply a control signal to the control terminal of the transistor,
    a computing unit electrically connected to the first output, the computing unit being configured to adjust the control signal so that the transistor has a low resistance value during a switched-on phase having a switched-on duration and a high resistance value during a switched-off phase having a switched-off duration,
    a first comparator having:
      a first input electrically connected to the first input of the control arrangement, the first input of the comparator configured to be supplied with a value of the first current or a value derived from the value of the first current,
      a second input configured to supply an adjustable setpoint value, and
      an output electrically connected to an input of the computing unit to adjust the duration of the switched-off phase.

2. The device of claim 1, wherein the control arrangement further comprises a mean-value generator electrically connected between the first input of the control arrangement and the first input of the first comparator, the mean-value generator being configured to find a mean value from the value of the first current and from at least one value of the first current from a time later during the switched-on phase.

3. The device of claim 2, wherein the mean-value generator comprises one or more of a low-pass filter and an integrator.

4. The device of claim 1, wherein the control arrangement further comprises a delay unit electrically connected between the first input of the control arrangement and the first input of the first comparator, the delay unit being configured to determine the value of the first current by sampling the first current at an adjustable time later than the start of the switched-on phase.

5. The device of claim 1, wherein the control arrangement further comprises an analog regulator configured to determine the duration of the switched-off phase and having an input electrically connected to an output of the first comparator and an output electrically connected to the computing unit.

6. The device of claim 1, wherein the control arrangement further comprises, a second comparator having
- a first input configured to supply the first current or a signal derived from the first current and electrically connected to the first input of the control arrangement and
- a second input for configured to supply an adjustable current limiting value, and
- an output electrically connected to a further input of the computing unit and configured to switch the transistor from the switched-on phase into the switched-off phase based on the comparison of the first current or of the signal derived from the first current in the switched-on phase with the adjustable current limiting value.

7. The device of claim 1, wherein the control arrangement further comprises a second input electrically connected to the computing unit and configured to supply a second voltage related to a voltage across a first and a second primary terminal of the transformer or of a voltage derived from the second voltage.

8. The device of claim 7, wherein the control arrangement further comprises a third comparator, comprising
- a first input electrically connected to the second input of the control arrangement and configured to supply a first adjustable voltage limit value to the second input, and
- an output electrically connected to the computing unit and configured to lengthen the switched-off phase by an adjustable extension duration based on a comparison between the second voltage, or the voltage derived from the second voltage and the second adjustable voltage limit value.

9. The device of claim 7, wherein the control arrangement further comprises a fourth comparator comprising:
- a first input electrically connected to the second input of the control arrangement and configured to supply a second adjustable voltage limit value to the second input, and
- an output electrically connected to the computing unit and configured to adjust the value of the resistance of the transistor based on a comparison of the second voltage, or the voltage derived from the second voltage and the second adjustable voltage limit value.

10. The device of claim 1, further comprising:
the transformer,
the transistor,
the device configured to sense a first current comprising a first resistor connected in series with the primary side of the transformer and in series with the controlled channel of the transistor,
a rectifier circuit electrically connected to a secondary side of the transformer and configured to provide the second DC voltage, wherein
the first input of the control arrangement is electrically connected to a terminal of the first resistor and the first output of the control arrangement is electrically connected to the control terminal of the transistor.

11. The device of claim 7, further comprising a second resistor between the second input of the control circuit and the second primary terminal of the transformer.

12. The device of claim 7, further comprising a third resistor between the second input of the control circuit and the first primary terminal of the transformer.

13. The device of claim 10, wherein the rectifier circuit comprises:
- a diode having an anode connected to a secondary terminal of the transformer, and
- a capacitor having a first electrode connected to a cathode of the diode and a second electrode connected to a further secondary terminal of the transformer, wherein the second DC voltage is available between the first and the second electrodes of the capacitor.

14. The device of claim 10, wherein the rectifier circuit comprises a bridge rectifier circuit or a centre-tapped circuit.

15. A method for converting a first D.C. voltage into a second D.C. voltage comprising:
storing energy in a transformer by:
- driving a transistor into a low-resistance state for a duration of a switched-on phase,
- supplying the first DC voltage to first and second primary terminals of the transformer, wherein the transistor is in one of the supply lines and a first current flows through a primary side of the transformer,
delivering energy to a secondary side of the transformer by driving the transistor into a high-resistance state during a duration of the switched-off phase, wherein the duration of the switched-off phase is based on a value of the first current in the switched-on phase or a value derived from the value of the first current during the switched-on phase, and
generating the second voltage by rectifying a second current from the secondary side of the transformer.

16. The method of claim 15, further comprising determining the duration of the switched-off phase by determining a mean value from the value of the first current and from at least one further value of the first current occurring at a later time during the switched-on phase.

17. The method of claim 15, further comprising determining a duration of the switched-off phase by determining the value of the first current in the switched-on phase by sampling the first current with an adjustable delay duration following the beginning of the switched-on phase.

18. The method of claim 15, further comprising adjusting the duration of the switched-on phase so that the first current during the switched-on phase has a lower magnitude than an adjustable first current limiting value.

19. The method of claim 15, further comprising lengthening the duration of the switched-off phase by an adjustable extension duration when the second DC voltage in the switched-off phase has a magnitude greater than a magnitude of an adjustable, first voltage limit value.

20. The method of claim 15, further comprising modifying the value of the resistance of the controlled channel in the transistor during a transition from the switched-on phase to the switched-off phase such that a second voltage between a first and a second primary terminal of the transformer is smaller than a second adjustable voltage limit value.

* * * * *